US008116525B2

(12) United States Patent
Guo et al.

(10) Patent No.: US 8,116,525 B2
(45) Date of Patent: Feb. 14, 2012

(54) OBJECT DETECTION METHOD AND APPARATUS THEREOF

(75) Inventors: Jing-Ming Guo, Taipei County (TW); Yang-Chen Tian, Hsinchu County (TW)

(73) Assignee: National Taiwan University of Science and Technology, Taipei (TW)

( * ) Notice: Subject to any disclaimer, the term of this patent is extended or adjusted under 35 U.S.C. 154(b) by 792 days.

(21) Appl. No.: 12/251,418

(22) Filed: Oct. 14, 2008

(65) Prior Publication Data

US 2010/0027842 A1    Feb. 4, 2010

(30) Foreign Application Priority Data

Aug. 1, 2008  (TW) .............................. 97129283 A

(51) Int. Cl.
*G06K 9/00*    (2006.01)
*H04N 7/18*    (2006.01)

(52) U.S. Cl. ...................... 382/103; 382/274; 348/143

(58) Field of Classification Search .................. 382/100, 382/103, 106, 107, 168, 173, 181, 199, 209, 382/232, 254, 274, 276, 286–295, 305, 312, 382/224
See application file for complete search history.

(56) References Cited

U.S. PATENT DOCUMENTS

| | | | | |
|---|---|---|---|---|
| 7,133,537 | B1 * | 11/2006 | Reid ............................. | 382/103 |
| 7,526,102 | B2 * | 4/2009 | Ozer ............................ | 382/103 |
| 7,825,954 | B2 * | 11/2010 | Zhang et al. .................. | 348/169 |
| 7,929,729 | B2 * | 4/2011 | Huang et al. ................. | 382/103 |
| 7,956,889 | B2 * | 6/2011 | Kelly et al. ................... | 348/143 |
| 7,957,597 | B2 * | 6/2011 | Steinberg et al. ............. | 382/224 |

* cited by examiner

*Primary Examiner* — Seyed Azarian
(74) *Attorney, Agent, or Firm* — Jianq Chyun IP Office

(57) ABSTRACT

An object detection method and an apparatus thereof are provided. In the object detection method, a plurality of images in an image sequence is sequentially received. When a current image is received, a latest background image is established by referring to the current image and the M images previous to the current image, so as to update one of N background images, wherein M and N are positive integers. Next, color models of the current image and the background images are analyzed to determine whether a pixel in the current image belongs to a foreground object. Accordingly, the accuracy in object detection is increased by instantly updating the background images.

17 Claims, 2 Drawing Sheets

OBJECT DETECTION METHOD AND APPARATUS THEREOF

CROSS-REFERENCE TO RELATED APPLICATION

This application claims the priority benefit of Taiwan application serial no. 97129283, filed on Aug. 1, 2008. The entirety of the above-mentioned patent application is hereby incorporated by reference herein and made a part of this specification.

BACKGROUND OF THE INVENTION

1. Field of the Invention

The present invention generally relates to an object detection method and an apparatus thereof, and more particularly, to an object detection method and an apparatus thereof which instantly updates a background to detect an object.

2. Description of Related Art

The demand to security monitoring system has been increasing along with the increasing consciousness to community security. A video cassette recorder (VCR) is usually used in a conventional analog monitoring system for recording the monitored content. However, an event can only be tracked by manually reviewing the recorded content after the event has happened. Thereby, the conventional analog monitoring system consumes a lot of manpower and accordingly the reliability thereof is greatly reduced.

In recently years, the development of intelligent monitoring systems is facilitated by the advancement of digital and multimedia techniques. In an intelligent monitoring system, the behaviors of a monitored object are digitally analyzed, and a warning message is issued when the object behaves abnormally so that action can be taken correspondingly. For example, a monitoring system integrated with a human face recognition technique can effectively prevent the intrusion of any stranger and automate the access management. In such a monitoring system based on object behavior analysis, a meaningful foreground object has to be correctly detected in order to carry out subsequent analysis and recognition operations.

It is very important in an object detection technique to establish a background by using sufficient number of images. Generally speaking, a background establishing model serves a pixel which appears the most number of times at the same position in the previous P images as the pixel at the same position in a reference background through a highest redundancy ratio (HRR) algorithm. Thereafter, the reference background is deducted from an input image to obtain a foreground object.

In the background establishing model described above, the previous P images are re-selected after a specific period to generate a new reference background and update the background. FIG. 1 is a diagram of a conventional background updating method. Referring to FIG. 1, the image sequence 100 includes a plurality of images 101 taken at different time. A reference background is established by performing HRR statistical analysis on the P images 101 in the sub image sequence 110. Next, during a specific period, a foreground object in each of the images 101 in the sub image sequence 120 is respectively detected according to the same reference background. After this specific period, the background establishing model re-selects the P images 101 in the sub image sequence 130 to establish a new reference background. Obviously, the background establishing model cannot instantly update the background as the scene variations in these images 101.

After the reference background is obtained, the reference background is deducted from an input image to obtain a foreground object. However, in an actual application, natural light changes, flickering, and shadowing may cause the foreground object to be wrongly determined. Accordingly, a RGB color model is provided, wherein the luminance difference and chrominance difference between the reference background and an input image are analyzed so as to categorize pixels in the input image into the foreground object, the background, the shadow, or bright spots.

In the method described above, when the chrominance difference between pixels at the same position in the input image and the reference background is greater than a threshold TH1, it is determined that the pixel in the input image belongs to the foreground object. However, as to those pixels in the input image which belong to the foreground object but have lower luminance, the chrominance difference between such a pixel and the pixel at the same position in the reference background is usually very small (i.e., the chrominance difference is smaller than the threshold TH1), the pixel may be mistakenly determined as belonging to a shadow. Accordingly, in this method, a pixel in the input image is determined as belonging to a foreground object when the luminance difference between this pixel in the input image and the pixel at the same position in the reference background is smaller than a threshold TH2. In short, a pixel in the input image is determined as belonging to a foreground object when either one of foregoing conditions regarding the luminance difference or the chrominance difference is met.

However, in the method described above, those pixels in the input image which belong to the foreground object but have higher luminance may be mistakenly determined as belonging to the bright spots in some cases when the chrominance difference obtained is still smaller than the threshold TH1. Thus, the analysis and process of luminance and chrominance have to be stricter in order to detect a complete foreground object.

SUMMARY OF THE INVENTION

Accordingly, the present invention is directed to an object detection method and an apparatus thereof, wherein a background image is instantly updated according to a current image so that the accuracy in object detection can be increased.

The present invention provides an object detection method. First, a plurality of images in an image sequence is sequentially received, wherein the images include a current image. When the current image is received, a latest background image is established by referring to the current image and the M images previous to the current image so as to update one of N background images, wherein M and N are positive integers. Next, color models of the current image and the background images are analyzed to determine whether a first pixel in the current image belongs to a first foreground object.

According to an embodiment of the present invention, an object matching process is performed on the first foreground object and a second foreground object in the previous image to determine whether the first foreground object is inherited from the second foreground object in the previous image.

The present invention provides an object detection apparatus including a receiving module, a background establishing module, and a first processing module. The receiving module sequentially receives a plurality of images in an image sequence, wherein the images include a current image. The background establishing module is coupled to the receiving module. When the background establishing module receives the current image, it establishes a latest background image by referring to the current image and the M images previous to the current image so as to update one of N background images, wherein M and N are positive integers. The first processing module is coupled to the background establishing module. The first processing module analyzes color models of the current image and the background images to determine whether a first pixel in the current image belongs to a first foreground object.

According to an embodiment of the present invention, the object detection apparatus further includes a second processing module coupled to the first processing module. The second processing module performs an object matching process on the first foreground object and a second foreground object in the previous image to determine whether the first foreground object is inherited from the second foreground object in the previous image.

In the present invention, a background is instantly updated by using a current image and the M images previous to the current image so that a foreground object can be correctly detected and subsequent analysis and recognition operations can be carried out. In addition, by performing an object matching process on the foreground object in the current image and the foreground object in the previous image, whether the foreground object in the current image is inherited from the previous image can be determined and accordingly object tracking can be carried out.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
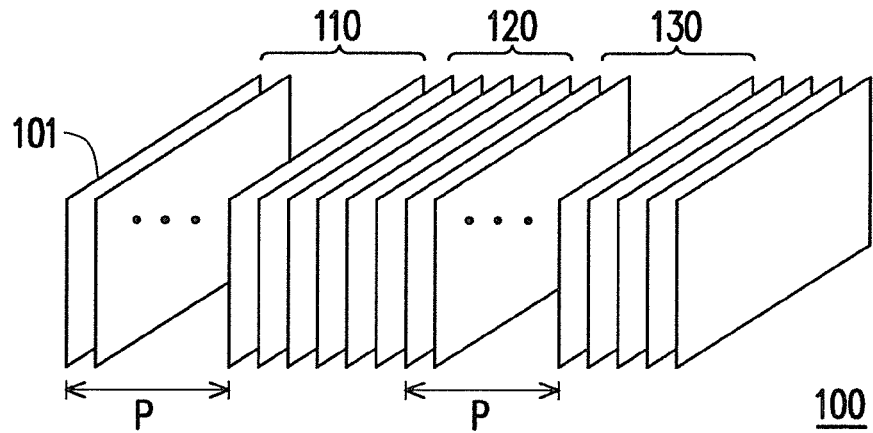
FIG. 1 is a diagram of a conventional background updating method.

Reference will now be made in detail to the present preferred embodiments of the invention, examples of which are illustrated in the accompanying drawings. Wherever possible, the same reference numbers are used in the drawings and the description to refer to the same or like parts.

Figure 2:
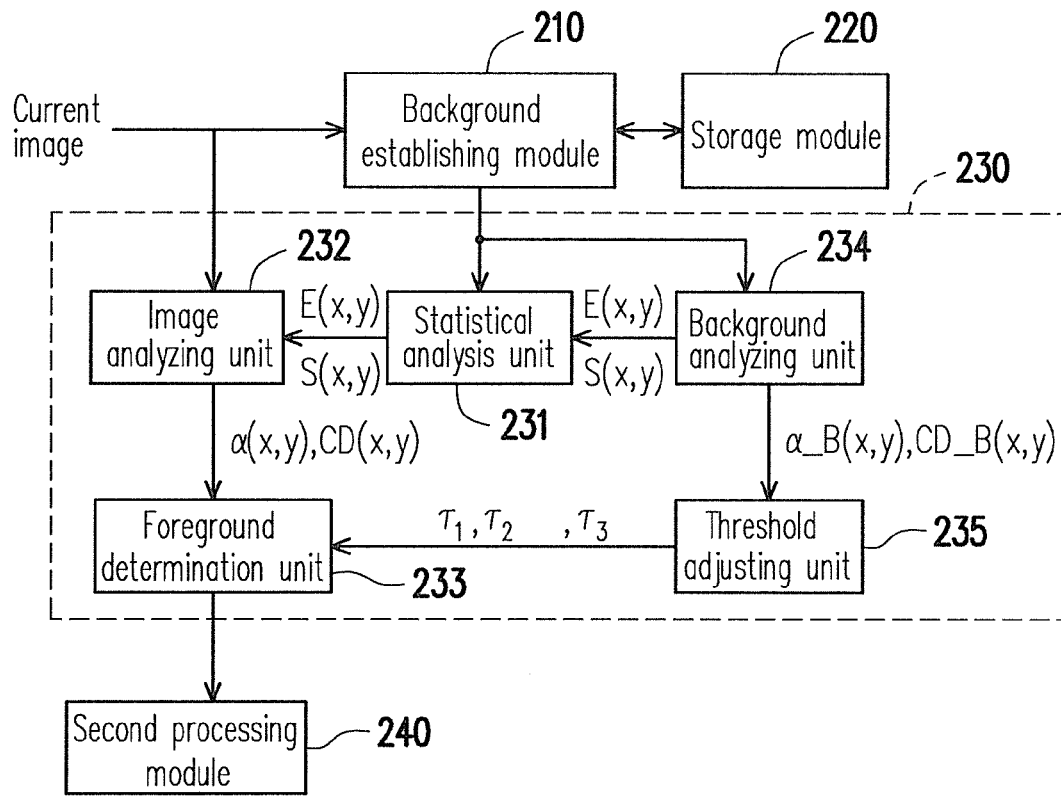
FIG. 2 is a diagram of an object detection apparatus according to an embodiment of the present invention.

FIG. 2 is a diagram of an object detection apparatus according to an embodiment of the present invention. Referring to FIG. 2, the object detection apparatus 200 includes a background establishing module 210, a storage module 220, a first processing module 230, and a second processing module 240. The background establishing module 210 sequentially receives a plurality of images in an image sequence. When the background establishing module 210 receives a current image, it establishes a latest background image by referring to the current image and the M images previous to the current image so as to update one of N background images, wherein M and N are positive integers. The storage module 220 stores the background images. The first processing module 230 is coupled to the background establishing module 210 for analyzing color models of the current image and the background images, so as to determine whether a pixel in the current image belongs to a first foreground object for detecting a foreground object. The second processing module 240 is coupled to the first processing module 230. The second processing module 240 performs an object matching process on the first foreground object in the current image and a second foreground object in the previous image to determine whether the first foreground object is inherited from the second foreground object in the previous image. Accordingly, the object can be tracked.

Figure 3:
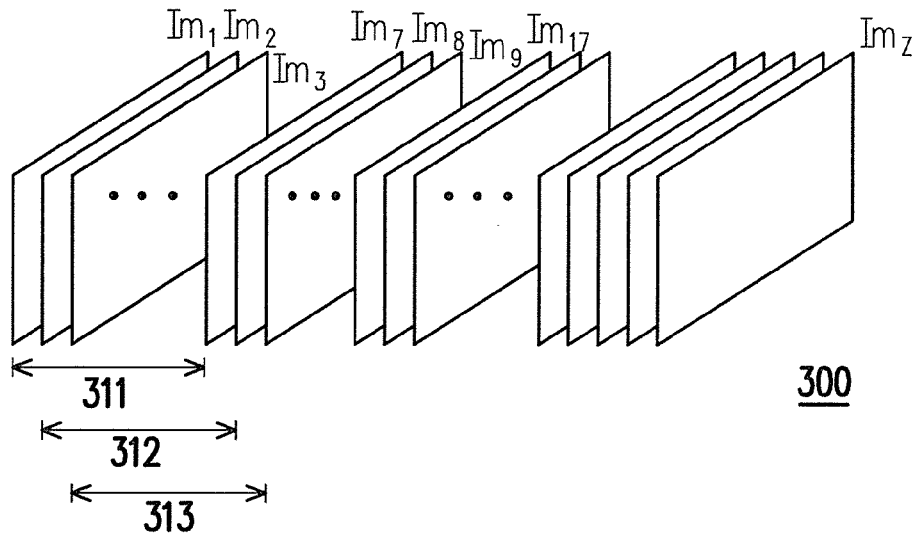
FIG. 3 is a diagram of a background updating method according to an embodiment of the present invention.

FIG. 3 is a diagram of a background updating method according to an embodiment of the present invention. In the present embodiment, a reference background image is established through the statistical analysis of N background images (will be described below) so that a first foreground object in a current image can be detected correctly. At the beginning, the background establishing module 210 establishes N background images (for example, N=10). Referring to FIG. 3, the background establishing module 210 sequentially receives images $Im_1$~$Im_Z$ in an image sequence 300. For example, when the background establishing module 210 receives the $7^{th}$ image $Im_7$, it establishes the first background image by referring to the current image $Im_7$ and the 6 images $Im_1$~$Im_6$ previous to the current image $Im_7$, namely, M=6. Next, when the background establishing module 210 receives the $8^{th}$ image $Im_8$, it establishes the second background image by referring to the current image $Im_8$ and the 6 images $Im_2$~$Im_7$ previous to the current image $Im_8$. As described above, when the background establishing module 210 receives the $16^{th}$ image $Im_{16}$, it establishes the $10^{th}$ background image by referring to the current image $Im_{16}$ and the 6 images $Im_{10}$~$Im_{15}$ previous to the current image $Im_{16}$. The 10 background images are sequentially stored in the storage module 220.

Herein, the background establishing module 210 uses a slide window to select the current image and the M images previous to the current image for establishing the background images, wherein the slide window, as denoted by symbols 311, 312, and 313, shifts one image at a time to establish multiple background images. In order to allow the reference background image to correspond to the changes of the scene in the current image, the N background images should be updated along with the current image. For example, when the background establishing module 210 receives the $17^{th}$ image $Im_{17}$, it establishes the $11^{th}$ background image (namely, the latest background image) by referring to the current image $Im_{17}$ and the 6 images $Im_{11}$~$Im_{16}$ previous to the current image $Im_{17}$, so as to update one of the 10 background images in the storage module 220, for example, the first established background image. Accordingly, the reference background image of the current image $Im_{17}$ can be obtained through statistical analysis of the $2^{nd}$~$11^{th}$ background images.

In the present embodiment, the background images are established by using a highest redundancy ratio (HRR) algorithm. According to the HRR algorithm, the value of a pixel P(x, y) and a redundant number of the pixel P(x, y) in each image are recorded, and whether the pixel P(x, y) belongs to a background image is determined according to the redundant number. When the difference between the pixel P(x, y) in the current image $Im_C$ and the pixel P(x, y) in the previous $I^{th}$ image $Im_{C-I}$ is smaller than or equal to a threshold T1, which means the pixel P(x, y) in the current image $Im_C$ appears in the previous $I^{th}$ image $Im_{C-I}$, the redundant number of the pixel P(x, y) in the previous $I^{th}$ image is accumulated, wherein $1 \leq C \leq Z$ and $1 \leq I \leq M$. When the redundant number of the pixel P(x, y) in the previous $I^{th}$ image $Im_{C-I}$ is greater than or equal to a threshold T2 or has the maximum value, which means the pixel P(x, y) belongs to the background image, the pixel P(x, y) in the previous $I^{th}$ image $Im_{C-I}$ is served as the pixel P(x, y) in the latest background image. If the difference between the pixel P(x, y) in the current image $Im_C$ and the pixel P(x, y) in the previous $I^{th}$ image $Im_{C-I}$ is greater than the threshold T1, which means the pixel P(x, y) in the current image $Im_C$ appears for the first time, the pixel P(x, y) in the current image $Im_C$ is recorded and the redundant number thereof is initialized to 1.

The first processing module 230 includes a statistical analysis unit 231, an image analyzing unit 232, and a foreground determination unit 233. The statistical analysis unit 231 is coupled to the background establishing module 210 for calculating a mean value E(x, y) and a standard deviation S(x, y) of the pixels P(x, y) in the N background images. The image analyzing unit 232 is coupled to the statistical analysis unit 231. The image analyzing unit 232 calculates a luminance distortion α(x, y) of the pixel P(x, y) in the current image $Im_C$ according to the mean value E(x, y), the standard deviation S(x, y), and the pixel P(x, y) in the current image $Im_C$. Besides, the image analyzing unit 232 further calculates a chrominance distortion CD(x, y) of the pixel P(x, y) in the current image $Im_C$ according to the mean value E(x, y), the standard deviation S(x, y), the luminance distortion α(x, y), and the pixel P(x, y) in the current image $Im_C$.

For example, $I_R(x, y)$, $I_G(x, y)$, and $I_B(x, y)$ are respectively the red, green, and blue gray scale of the pixel P(x, y) in the current image $Im_C$, $E_R(x, y)$, $E_G(x, y)$, and $E_B(x, y)$ are respectively the red, green, and blue gray scale mean value of the pixel P(x, y) in the N background images, and $S_R(x, y)$, $S_G(x, y)$, and $S_B(x, y)$ are respectively the red, green, and blue standard deviation of the pixel P(x, y) in the N background images. Accordingly, the luminance distortion α(x, y) and the chrominance distortion CD(x, y) are respectively expressed as:

$$\alpha(x, y) = \left( \frac{I_R(x, y) \times E_R(x, y)}{S_R^2(x, y)} + \frac{I_G(x, y) \times E_G(x, y)}{S_G^2(x, y)} + \frac{I_B(x, y) \times E_B(x, y)}{S_B^2(x, y)} \right) \div \left[ \left( \frac{E_R(x, y)}{S_R(X, y)} \right)^2 + \left( \frac{E_G(x, y)}{S_G(X, y)} \right)^2 + \left( \frac{E_B(x, y)}{S_B(X, y)} \right)^2 \right]$$

$$CD(x, y) = \sqrt{ \left( \frac{I_R(x, y) - \alpha(x, y) \times E_R(x, y)}{S_R(x, y)} \right)^2 + \left( \frac{I_G(x, y) - \alpha(x, y) \times E_G(x, y)}{S_G(x, y)} \right)^2 + \left( \frac{I_B(x, y) - \alpha(x, y) \times E_B(x, y)}{S_B(x, y)} \right)^2 }$$

As shown in foregoing expressions, the chrominance distortion CD(x, y) is derived from the luminance distortion α(x, y). Generally, whether the pixel P(x, y) in the current image $Im_C$ belongs to the first foreground object is determined according to the chrominance distortion CD(x, y). Namely, when the chrominance distortion CD(x, y) of the pixel P(x, y) in the current image $Im_C$ is greater than a chrominance upper limit $\tau_1$, it can be determined intuitionally that the pixel P(x, y) in the current image $Im_C$ belongs to the first foreground object. However, when the pixel P(x, y) in the current image $Im_C$ is too dark or too bright, the chrominance thereof is not presented very obviously. In this case, the chrominance distortion CD(x, y) of the pixel P(x, y) in the current image $Im_C$ may fall within the threshold $\tau_1$ and accordingly the pixel P(x, y) in the current image $Im_C$ may be wrongly determined as belonging to a shadow or a bright spot.

In order to prevent that the pixel P(x, y) in the current image $Im_C$ is determined not to belong to the first foreground object due to the luminance variation thereof, in the present embodiment, a luminance upper limit and a luminance lower limit are set by the foreground determination unit 233. The foreground determination unit 233 is coupled to the image analyzing unit 232. When the chrominance distortion CD(x, y) of the pixel P(x, y) in the current image $Im_C$ is greater than the chrominance upper limit $\tau_1$, the luminance distortion α(x, y) of the pixel P(x, y) in the current image $Im_C$ is smaller than a luminance lower limit $\tau_2$, or the luminance distortion α(x, y) of the pixel P(x, y) in the current image $Im_C$ is greater than the luminance upper limit $\tau_3$, the foreground determination unit 233 determines that the pixel P(x, y) in the current image $Im_C$ belongs to the first foreground object. Thus, the first foreground object can be detected by analyzing the pixels in the current image.

In the present embodiment, the N background images are updated along with the current image $Im_C$. Thus, the chrominance upper limit $\tau 1$, the luminance lower limit $\tau 2$, and the luminance upper limit $\tau_3$ of the pixel P(x, y) in the current image $Im_C$ should be corrected corresponding to the reference background image. Referring to FIG. 2, the first processing module 230 further includes a background analyzing unit 234 and a threshold adjusting unit 235. The background analyzing unit 234 is coupled to the statistical analysis unit. The background analyzing unit 234 calculates a luminance distortion α_B(x, y) of the pixel P(x, y) in the latest background image according to the mean value E(x, y) and the standard deviation S(x, y) of the pixels P(x, y) in the N background images and the pixel P(x, y) in the latest background image. Moreover, the background analyzing unit 234 calculates a chrominance distortion CD_B(x, y) of the pixel P(x, y) in the latest background image according to the mean value E(x, y) and the standard deviation S(x, y) of the pixels P(x, y) in the N background images, the luminance distortion α_B(x, y) of the pixel P(x, y) in the latest background image, and the pixel P(x, y) in the latest background image.

The threshold adjusting unit 235 is coupled between the background analyzing unit 234 and the foreground determination unit 233. The threshold adjusting unit 235 adjusts the luminance lower limit $\tau 2$ and the luminance upper limit $\tau_3$ according to the luminance distortion α_B(x, y) of the pixel P(x, y) in the latest background image. In addition, the threshold adjusting unit 235 adjusts the chrominance upper limit $\tau 1$ according to luminance distortion α_B(x, y) and the chrominance distortion CD_B(x, y) of the pixel P(x, y) in the latest background image. Accordingly, the chrominance upper limit $\tau 1$, the luminance lower limit $\tau 2$, and the luminance upper limit $\tau_3$ can be dynamically adjusted and accordingly the accuracy in object detection can be increased.

After the first foreground object in the current image is detected, the object can be tracked to determine which foreground object in the previous image the first foreground object in the current image is inherited from. In the present embodiment, the second processing module 240 performs an object matching process on the first foreground object in the current image and a second foreground object in the previous image. For the convenience of description, the first foreground object in the current image is denoted as C1(i) from bottom to top, and the second foreground object in the previous image is denoted as C2(j) from bottom to top.

The second processing module 240 calculates a centroid distance CentDis(i, j), an area difference AreaDif(i, j), and an overall area OverArea(i, j) between the first foreground object C1(i) in the current image and the second foreground object C2(j) in the previous image. Next, the second processing module 240 calculates a weighted sum cost(i, j) of the centroid distance CentDis(i, j), the area difference AreaDif(i, j), and the overall area OverArea(i, j). When the weighted sum cost(i, j) has the maximum value, it is determined that the first foreground object C1(i) in the current image is inherited from the second foreground object C2(j) in the previous image. Foregoing calculations are expressed as:

$$CentDis(i, j) = \sqrt{(x_i - x_j)^2 + (y_i - y_j)^2}$$

$$Areadif(i, j) = |ObjArea(i) - ObjArea(j)|$$

$$OverArea(i, j) = ObjArea(i) \cap ObjArea(j)$$

$$cost(i, j) = \alpha \frac{1}{CentDis(i, j)+1} + \beta \frac{1}{AreaDif(i, j)+1} + \gamma \frac{OverArea(i, j)}{ObjArea(i)}$$

Referring to foregoing expressions, the centroid distance CentDis(i, j) is calculated through an Euclidean distance formula, wherein $(x_i, y_i)$ and $(x_j, y_j)$ are respectively the centroid coordinates of the first foreground object C1(i) and the second foreground object C2(j). The area difference AreaDif(i, j) is the difference between the object area ObjArea(i) of the first foreground object C1(i) and the object area ObjArea(i) of the second foreground object C2(j), wherein an object area can be obtained based on the number of pixels contained in a foreground object. In addition, the overall area OverArea(i, j) is the number of pixels covered by the intersection of the object area ObjArea(i) of the first foreground object C1(i) and the object area ObjArea(i) of the second foreground object C2(j). Herein, the parameters α, β, and γ can be obtained through feature training of different image sequences.

Figure 4:
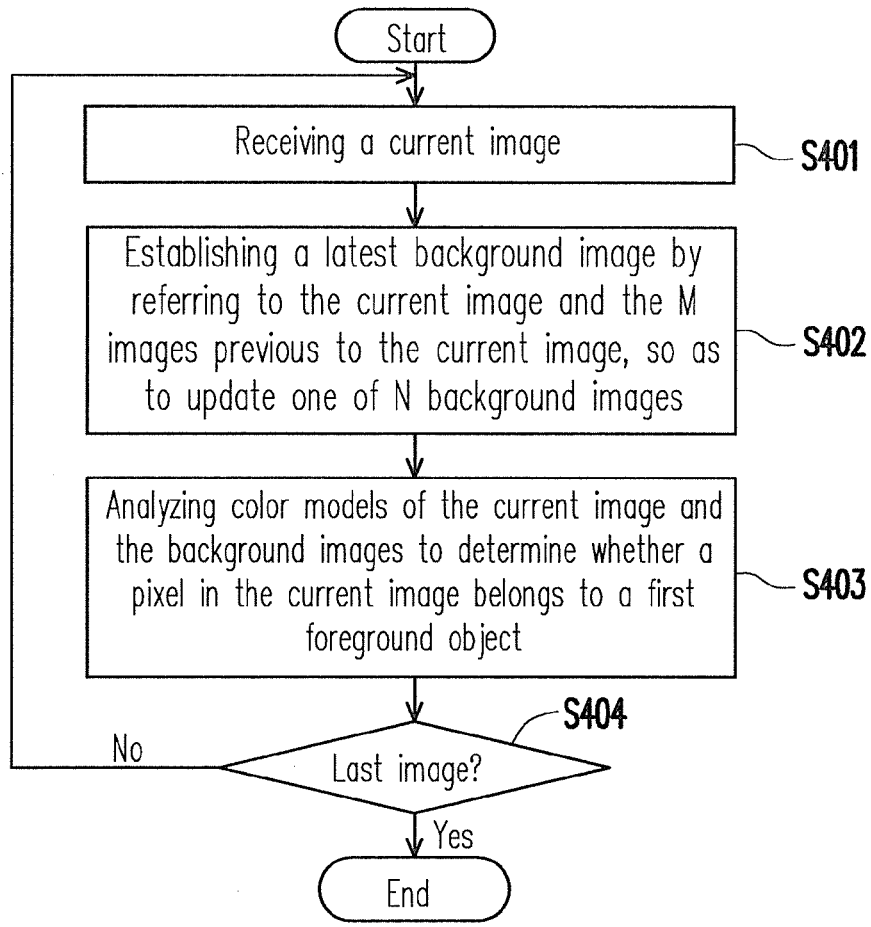
FIG. 4 is a flowchart of an object detection method according to an embodiment of the present invention.

An object detection method in the present invention can be summarized from foregoing descriptions. FIG. 4 is a flowchart of an object detection method according to an embodiment of the present invention. Referring to FIG. 4, first, a current image is received in step S401. Then, a latest background image is established by referring to the current image and M images previous to the current image, so as to update one of N background images in step S402. Accordingly, a reference background image can be updated according to changes in the current image. Next, in step S403, the color models of the current image and the background images are analyzed to determine whether a pixel in the current image belongs to a first foreground object. In step S404, if the current image is not the last image, the next image is received so as to sequentially receive the images in an image sequence and detect foreground objects in each of the images.

As described above, in the present invention, regarding each input image, M images previous to the input image are used for generating a background image, so as to update one of N background images instantly. Not only a reference background image can be updated along with the input image, but also the accuracy in object detection can be increased. Moreover, when a foreground object is detected, color models of the current image and the background images are analyzed to determine whether a pixel in the current image belongs to a foreground object. To prevent that a pixel in the current image is determined not to belong to the foreground object due to variations in the luminance of the pixel, a luminance upper limit and a luminance lower limit are set in the present invention. After the foreground object is detected, the object can be tracked through an object matching process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An object detection method, comprising:
sequentially receiving a plurality of images in an image sequence, wherein the images comprise a current image;
establishing a latest background image by referring to the current image and the M images previous to the current image when the current image is received, so as to update one of N background images, wherein M and N are positive integers, wherein the step of establishing the latest background image by referring to the current image and the M images previous to the current image comprises:
accumulating a redundant number of the first pixel in the previous $I^{th}$ image when a difference between the first pixel in the current image and the first pixel in the previous $I^{th}$ image is smaller than or equal to a first threshold, wherein $1 \leq I \leq M$; and
serving the first pixel in the previous $I^{th}$ image as the first pixel in the latest background image when the redundant number of the first pixel in the previous $I^{th}$ image is greater than a second threshold, equal to the second threshold, or has a maximum value; and
analyzing color models of the current image and the background images to determine whether a first pixel in the current image belongs to a first foreground object.

2. The object detection method according to claim 1 further comprising:
performing an object matching process on the first foreground object and a second foreground object in a previous image to determine whether the first foreground object is inherited from the second foreground object in the previous image.

3. The object detection method according to claim 2, wherein the object matching process comprises:
calculating a centroid distance, an area difference, an overall area between the first foreground object and the second foreground object;
calculating a weighted sum of the centroid distance, the area difference, and the overall area; and
determining that the first foreground object is inherited from the second foreground object when the weighted sum has a maximum value.

4. The object detection method according to claim 1, wherein the step of establishing the latest background image by referring to the current image and the M images previous to the current image further comprises:
recording the first pixel in the current image and initializing the redundant number of the first pixel in the current image when a difference between the first pixel in the current image and the first pixel in each of the previous M images is greater than the first threshold.

5. The object detection method according to claim 1, wherein the step of analyzing the color models of the current image and the background images to determine whether the first pixel in the current image belongs to the first foreground object comprises:
calculating a mean value and a standard deviation of the first pixel in the background images;
calculating a first luminance distortion of the first pixel in the current image according to the mean value, the standard deviation, and the first pixel in the current image;
calculating a first chrominance distortion of the first pixel in the current image according to the mean value, the standard deviation, the first luminance distortion, and the first pixel in the current image; and
determining that the first pixel in the current image belongs to the first foreground object when the first chrominance distortion is greater than a chrominance upper limit, the first luminance distortion is smaller than a luminance lower limit, or the first luminance distortion is greater than a luminance upper limit.

6. The object detection method according to claim 5, wherein the step of analyzing the color models of the current image and the background images to determine whether the first pixel in the current image belongs to the first foreground object further comprises:

calculating a second luminance distortion of the first pixel in the latest background image according to the mean value, the standard deviation, and the first pixel in the latest background image; and adjusting the luminance lower limit and the luminance upper limit according to the second luminance distortion.

7. The object detection method according to claim 6, wherein the step of analyzing the color models of the current image and the background images to determine whether the first pixel in the current image belongs to the first foreground object further comprises:

calculating a second chrominance distortion of the first pixel in the latest background image according to the mean value, the standard deviation, the second luminance distortion, and the first pixel in the latest background image; and adjusting the chrominance upper limit according to the second luminance distortion and the second chrominance distortion.

8. The object detection method according to claim 1, wherein the updated background image is the first established background image among the background images.

9. An object detection apparatus, comprising:

a background establishing module, for sequentially receiving a plurality of images in an image sequence, and establishing a latest background image by referring to the current image and the M images previous to the current image when a current image among the images is received, so as to update one of N background images, wherein M and N are positive integers; and a first processing module, coupled to the background establishing module, for analyzing color models of the current image and the background images to determine whether a first pixel in the current image belongs to a first foreground object, wherein the background establishing module accumulates a redundant number of the first pixel in the previous $I^{th}$ image when a difference between the first pixel in the current image and the first pixel in the previous $I^{th}$ image is smaller than or equal to a first threshold, wherein $1 \leq I \leq M$, and the background establishing module serves the first pixel in the previous $I^{th}$ image as the first pixel in the latest background image when the redundant number of the first pixel in the previous $I^{th}$ image is greater than a second threshold, equal to the second threshold, or has a maximum value.

10. The object detection apparatus according to claim 9 further comprising:

a second processing module, coupled to the first processing module, for performing an object matching process on the first foreground object and a second foreground object in a previous image to determine whether the first foreground object is inherited from the second foreground object in the previous image.

11. The object detection apparatus according to claim 10, wherein the object matching process comprises:

calculating a centroid distance, an area difference, and an overall area between the first foreground object and the second foreground object;

calculating a weighted sum of the centroid distance, the area difference, and the overall area; and determining that the first foreground object is inherited from the second foreground object when the weighted sum has a maximum value.

12. The object detection apparatus according to claim 9, wherein the background establishing module records the first pixel in the current image and initializes the redundant number of the first pixel in the current image when a difference between the first pixel in the current image and the first pixel in each of the previous M images is greater than the first threshold.

13. The object detection apparatus according to claim 9, wherein the first processing module comprises:

a statistical analysis unit, coupled to the background establishing module, for calculating a mean value and a standard deviation of the first pixel in the background images;

an image analyzing unit, coupled to the statistical analysis unit, for calculating a first luminance distortion of the first pixel in the current image according to the mean value, the standard deviation, and the first pixel in the current image, and for calculating a first chrominance distortion of the first pixel in the current image according to the mean value, the standard deviation, the first luminance distortion, and the first pixel in the current image; and a foreground determination unit, coupled to the image analyzing unit, for determining that the first pixel in the current image belongs to the first foreground object when the first chrominance distortion is greater than a chrominance upper limit, the first luminance distortion is smaller than a luminance lower limit, or the first luminance distortion is greater than a luminance upper limit.

14. The object detection apparatus according to claim 13, wherein the first processing module further comprises:

a background analyzing unit, coupled to the statistical analysis unit, for calculating a second luminance distortion of the first pixel in the latest background image according to the mean value, the standard deviation, and the first pixel in the latest background image; and a threshold adjusting unit, coupled between the background analyzing unit and the foreground determination unit, for adjusting the luminance lower limit and the luminance upper limit according to the second luminance distortion.

15. The object detection apparatus according to claim 14, wherein the background analyzing unit further calculates a second chrominance distortion of the first pixel in the latest background image according to the mean value, the standard deviation, the second luminance distortion, and the first pixel in the latest background image, and the threshold adjusting unit adjusts the chrominance upper limit according to the second luminance distortion and the second chrominance distortion.

16. The object detection apparatus according to claim 9, wherein the updated background image is the first established background image among the background images.

17. The object detection apparatus according to claim 9 further comprising:

a storage module, for storing the background images.

* * * * *